April 7, 1942.　　　A. J. COLLINS　　　2,279,110
ARMOR PLATE
Filed Nov. 22, 1937
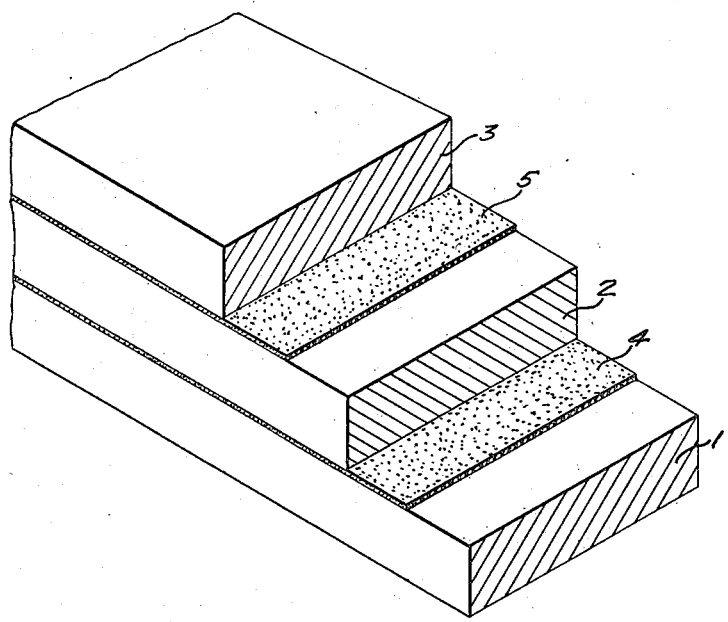
INVENTOR
ALLAN J. COLLINS
BY
Moses & Nolte
ATTORNEYS

UNITED STATES PATENT OFFICE

2,279,110
ARMOR PLATE

Allan J. Collins, Stamford, Conn., assignor, by mesne assignments, to Edmund Quincy Moses, Scarboro, N. Y.

Application November 22, 1937, Serial No. 175,840

3 Claims. (Cl. 89—36)

This invention relates to armor plate and more particularly laminated armor plate in which the sections or laminations are secured to each other by the adhesive action of a binding medium.

Laminated armor plate has heretofore been proposed having an outside layer or hard metallic material such as hard steel, and softer inner layers, comprising soft metal, wood, rubber, or the like, beneath the outside hard layer, the theory being that the softer layers will cushion the effect of a sharp blow against the outside harder lamination.

However, armor plates of this character are unsatisfactory, since once the projectile pierces the outside relatively hard layer, little resistance is offered to its passage through the remainder of the armor by the supposed cushioning layers. Accordingly, the cushioning effect of itself is of little, if any, value in resisting penetration by a projectile.

Laminated armor plate has also been proposed in which laminations or layers of metal are secured together by inflexible mechanical means such as welding, bolting, riveting, or the like. On securing these plates together by these means, however, any advantage to be derived from laminated construction is thereupon lost, since the series of laminations is reduced to substantially a solid single layer construction.

Furthermore, armor plate construction bound together by bolts or rivets is necessarily weakened by the holes made to hold such bolts or rivets, and is, consequently, less resistant to penetration and shattering when struck by a projectile. The bolts or rivets themselves are vulnerable points which offer little resistance to the impact and penetration of a projectile. It is for this reason that solid armor plate is customarily secured in place by means of tap screws which penetrate the inner surface of the armor for but a small fraction of its thickness.

It is an object of my invention to provide laminated armor plate in which the laminations are held firmly together throughout their extent by a comparatively soft and flexible material of sufficient strength to insure a commercially solid unit, and yet of insufficient strength to transmit any rupture, shattering or distortion caused by an impinging projectile in one lamination to an adjoining lamination.

It is an object of my invention to provide a structure of this nature which interposes in the path of an impinging projectile a series of smooth surfaces that the projectile must shatter or pierce successively and independently.

Many structures or bodies subjected to severe stress or shock will fail readily if their surface resistance is broken down, regardless of the mass behind that surface, and it is apparent that my invention takes maximum advantage of this principle by creating a type of armor which provides for multiplying serially the surface strength and resistance of a plate structure any desired number of times.

It is a further object of my invention to provide a laminated body of great strength and impact resistance in which the laminations or layers shall have interposed between them insulating and sealing materials having elastic qualities which will prevent the transmission from one lamination to an adjoining lamination of any damage caused by an impinging projectile, but which will hold the laminations firmly together in permanent relation.

It is a further object of my invention to provide armor plate composed of relatively thick layers of steel, or the like, between which are inserted relatively thin layers of adhesive material.

It is a further object to provide such laminated armor plate in which the adhesive material shall be rubber, which may be inserted between the steel plates and made to adhere thereto and to hold the plates in permanent binding relation by vulcanization. Plates thus vulcanized together will also be effectively protected against corrosion and the action of the elements.

The figure comprising the drawing is a perspective view of the armor.

In the figure which is offered for purposes of illustration and explanation only, a series of relatively thick layers 1, 2, 3, which may be of any material having impact resistant qualities, preferably alloy steel, is shown. Between the layers are inserted relatively thin layers 4, 5 of rubber or similar adhesive material.

While the adhesive material may have some slight cushioning effect, its fundamental purpose is not the provision of this characteristic in the armor plate, but rather to bind the laminations in close and permanent relation without causing any lamination to lose its identity as a single impact resistant surface.

In the construction of my improved armor plate I provide relatively thick plates of hard metal as shown of either equal or unequal thickness and of similar or dissimilar metallic characteristics.

I have found it advantageous in some cases to use as an outside layer, or an outside series of layers, alloy steel having the particular characteristic of hardness and to use for the inner layer or layers alloy steel which is characterized particularly by toughness. The result of the use of alloy steels in this relation is that an impinging projectile has its point blunted or shattered by the hard, relatively brittle surface laminations and the tough inner laminations or lamination will hold the structure of the armor together if the hard laminations are shattered by the impact of the projectile. For substantially the same reasons, I have also found it advantageous in other cases to use alternate layers of hard and tough alloy steels throughout the structure of my laminated armor plate.

Between these various layers I place thin sheets of adhesive material. As an example of the relative thickness of the layers of metal and adhesive material I may use metal plates of approximately ¼" thickness and interpose therebetween sheets of adhesive material of approximately $\frac{1}{32}$" thickness. However, these dimensions and relative thicknesses may, of course, be widely departed from within any limits which will produce the desired results. Treatment of the adhesive material either by heat or by any means which cause the material to adhere to the superimposed laminations and make an elastic connection therewith seals the series of laminations into a single unit, the plates being held together by the adherence of the elastic material. In a case where heat is used, such as in the heat vulcanizing of rubber, the temperature naturally must not be sufficiently high to change or impair the heat treated qualities or the internal metallic structure of the steel or other metal used for laminations.

The advantage derived from this method of uniting the plates lies in the fact that the surface of each plate supports and binds the surface of each adjoining plate so that when an outer surface is struck and damaged by a projectile each successive inner surface remains uninjured and therefore retains its full strength to oppose the further passage of the projectile through the structure. Furthermore, the supporting character of adjacent plates is such that a plate which might be sufficiently hard hit to bend and rupture from bending rather than shatter, will be supported by its adjacent plate and rupture caused by bending thereby prevented.

In the case of ordinary armor an impinging projectile enters the armor with what might be described as a wedging action, tending to thrust aside the material of the armor in lateral directions away from the original point of impact. This wedging action is transmitted through the entire thickness of the armor even before the projectile itself actually travels therethrough. However, in my armor plate the wedging action of the projectile through the entire structure is, of course, impossible, since it can act on no more than one plate at a time and the wedging effect which obtains in the first lamination cannot be transmitted to the succeeding lamination because the adhesive material used between the laminations has insufficient strength to transmit such wedging action. Accordingly, when a projectile passes through the first lamination 1 and has its point blunted or shattered by impact against this layer, it meets at 2 with another complete surface upon which no previous wedging action has been exerted and which is, accordingly, practically as strong and impact resistant as the surface through which it has just passed. This surface, however, does not receive nearly the shock or blow received by the first surface since the passage of the projectile has been impeded and since the point of the projectile has been rendered ineffective. Thus, the projectile loses penetrating force as it meets each succeeding lamination and is not able to penetrate the entire series of laminations.

In view of these considerations, the advantage of providing a lamination or laminations of relative toughness beneath the outer layer or layers of particularly hard steel can be seen. The effectiveness of the pointed projectile will be diminished by the hard outer layers and the shattering effect of the impact on the armor will be resisted by the inner tough layer or layers.

My laminated armor plate may be secured to the structure to which it is applied in any customary fashion which will not have the effect of marring or weakening the outer surface thereof. Thus, shallow tap screws may be inserted in the inner wall of the armor for a slight distance in proportion to its entire thickness. Other means of application to armored structure will suggest themselves to those skilled in the art.

I have not found it necessary to achieve the new and advantageous effect disclosed herein to use rubber exclusively as sealing material between the plates, as such materials as nitrocellulose derivatives or other compounds may be used, provided that treatment by heat similar to vulcanization or treatment by any other process or agent will cause the said interlining material to adhere to the plates on either side of it and act as a support, holding the plates together. A thin layer of soft, easily fusible metal such as solder would also serve as the connecting means between the plates and would have a similar effect in causing the armor to present a series of independent surfaces to an impinging projectile. However, I have found that non-metallic sealing material is more desirable both from the standpoint of elasticity and the standpoint of insulation of shock.

I further do not propose to limit my discovery to any particular type of steel or other metal armor, intending to cover laminated plates generally which are prepared for the purpose of impeding the passage of projectiles of any sort whatsoever therethrough.

I claim:

1. Armor plate comprising sheets of steel placed face to face in juxtaposition with each other, and adherent means capable of alone securing and supporting the respective sheets of steel from adjacent sheets without permitting longitudinal or lateral facewise displacement of one sheet relative to the other sheets, comprising sheets of comparatively soft bonding material of considerably less thickness than said steel sheets covering all portions of adjoining faces of the steel sheets and interposed therebetween, said sheets of bonding material constituting the sole securing and supporting means for the steel sheets relative to each other, the steel sheets being arranged one behind the other to present successive independent projectile impact resisting sheet face portions, the steel sheets being spaced only by the sheets of bonding material, the latter being sufficiently thick to prevent transmission of rupturing effects from a forwardly disposed steel sheet to a steel sheet therebehind.

2. Armor plate comprising sheets of steel placed face to face in juxtaposition with each other, and adherent means capable of alone securing an supporting the respective sheets of steel from adjacent sheets without permitting longitudinal or lateral facewise displacement of one sheet relative to the other sheets, comprising sheets of rubber of considerably less thickness than said steel sheets covering and vulcanized to all portions of adjoining faces of the steel sheets and interposed therebetween, said sheets of rubber constituting the sole securing and supporting means for the steel sheets relative to each other, the steel sheets being arranged one behind the other to present successive independent projectile impact resisting sheet face portions, the steel sheets being spaced only by the sheets of rubber, the latter being sufficiently thick to prevent transmission of rupturing effects from a forwardly disposed steel sheet to a steel sheet therebehind.

3. Laminated armor comprising superimposed sheets of steel and sheets of rubber relatively thin with respect to the sheets of steel interposed between the steel sheets, the rubber sheets being vulcanized to the steel sheets to constitute the sole securing and supporting means for the steel sheets relative to each other.

ALLAN J. COLLINS.